No. 682,444. Patented Sept. 10, 1901.
C. E. W. WOODWARD.
FABRIC FOR USE IN THE PRODUCTION OF AIR-TIGHT TUBING.
(Application filed Apr. 22, 1901.)
(No Model.)
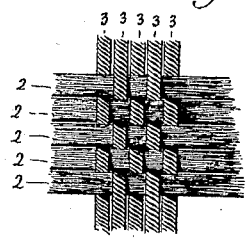
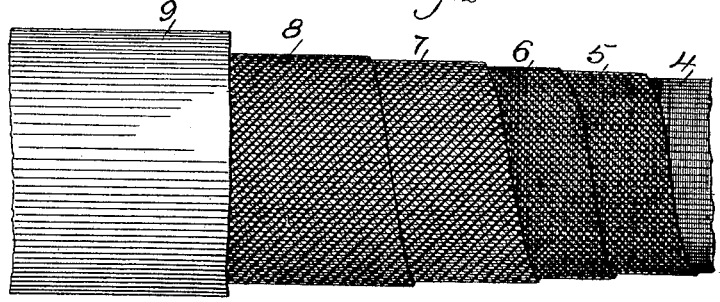

UNITED STATES PATENT OFFICE.

CHARLES E. W. WOODWARD, OF CHICOPEE, MASSACHUSETTS.

FABRIC FOR USE IN THE PRODUCTION OF AIR-TIGHT TUBING.

SPECIFICATION forming part of Letters Patent No. 682,444, dated September 10, 1901.

Application filed April 22, 1901. Serial No. 56,906. (No specimens.)

*To all whom it may concern:*

Be it known that I, CHARLES E. W. WOODWARD, of Chicopee, in the county of Hampden and State of Massachusetts, have invented a new Improvement in Fabrics for Use in the Production of Air-Tight Tubing; and I do hereby declare the following, when taken in connection with the accompanying drawings and the figures of reference marked thereon, to be a full, clear, and exact description of the same, and which said drawings constitute part of this specification, and represent, in—

Figure 1, an enlarged view of a small section of my improved fabric as woven; Fig. 2, a broken view of a short piece of air-tight tubing produced with my improved fabric and showing the winding of the bias strips thereof so that the warp-threads of the two inner strips are disposed at right angles to the warp-threads of the two overlying strips.

My invention relates to an improved woven fabric for use in the production of air-tight tubing, such as that used in the manufacture of hose and of pneumatic tires for vehicles, the object being to produce at a comparatively low cost of manufacture a fabric designed with particular reference to securing for the completed hose or tire a uniform resistance to strains in all directions, a better assimilation of the preparation of rubber applied to the fabric, and a higher degree of resistance to punctures.

With this end in view my invention consists, as a new article of manufacture, in a close-woven fabric for the production of air-tight tubing, the said fabric having non-extensible hard-wound warp-threads and soft loosely-wound highly-absorbent woof-threads which permit the hard warp-threads to be embedded in their loose soft fibers, which readily absorb the rubber preparation applied to the opposite faces of the fabric and which mat together, woof-thread to woof-thread, to form a strongly-cohesive but elastic mat to resist the puncturing of the fabric.

For the illustration of my invention I have chosen a piece of fabric produced with particular reference to use in the manufacture of heavy pneumatic tires for automobiles; but it will of course be understood that the weight of the fabric and the number of threads entering into it per square inch will be varied according to the particular character of the use to which air-tight tubes made from it are to be put.

As herein shown, the fabric consists of very soft loosely-wound bulky highly-absorbent extensible woof-threads 2, having something of the quality of long strands or locks of fibers and woven together with a corresponding number of relatively hard-wound non-extensible warp-threads 3, which become more or less embedded in the soft fluffy woof-threads. Thus I may employ eight-strand hard-wound warp-threads and woof-threads consisting of a single strand wound only just enough to enable them to stand the strain of weaving. It is not necessary that the woof and warp threads should correspond to each other in number, but only that sufficient of each shall be employed to produce a comparatively close-woven fabric as distinguished from tubing fabrics in which the warp-threads are barely held together by woof-threads arranged at intervals and designed merely to maintain the relations of the warp-threads in handling the fabric and performing no function after the fabric has been built up into tubes. My fabric so produced is treated on both sides with any one of the several different preparations of rubber, which is applied usually by means of calendering-rolls, through which the fabric is passed with the warp-threads at right angles to the axes of the rolls. During this operation the warp-threads are extended and more or less embedded in the soft fluffy fibers of the woof-threads. Moreover, the tension imposed upon the non-extensible warp-threads by internal air-pressure causes them to flatten out the soft fluffy laterally and longitudinally extensible woof-threads in which they are thus further embedded. As the woof-threads do not resist extension, the warp-threads straighten out and "part," so to speak, with the convolutions imposed upon them in the process of weaving to a greater degree than in the close-woven fabrics usually employed, and thus confer a very high speed quality to tires into which the fabric enters on a principle well understood by persons learned in this art. This embedding of the hard warp-threads very markedly protects the warp-threads from abrading each other when under tension, for it is to be remembered that in producing tubes with this fabric strips of it are wound upon each other, so that the warp-threads of the respective strips extend at right angles to each other, as shown in Fig. 2, which represents a short section of tubing, comprising an inner or core tube 4 of rubber, two coils 5 and 6 of a strip of my improved fabric applied with its rubber skim coat outward, two coils 7 and 8 of a strip of my improved fabric applied with its rubber skim coat inward, and a rubber envelop or tread 9. What I wish to call attention to is that the warp-threads 2 of the coils 5 and 6 extend at right angles to the warp-threads 2 of the coils 7 and 8.

When the rubber preparation is applied to the opposite faces of the fabric, it is absorbed very readily into or, as I might say, "assimilated" by the soft spongy woof-threads, so that the preparation becomes more intimately incorporated into the body of the fabric than is possible with a fabric composed of hard-wound threads. It is unnecessary to say that a fabric in which the rubber preparation is so completely assimilated is very much stronger than the fabrics ordinarily produced, with a corresponding increase in the strength of the tubes, and, moreover, my improved fabric secures on this account very much stronger adhesion to the layers of fabric or rubber which come in contact with it. This is very important in pneumatic tires, the outer coverings of which often become loosened and for the very reason that they do not adhere with sufficient strength to the fabrics heretofore used for building up the body of the tube proper. Furthermore, when my improved fabric is subjected to the pressure required for applying the rubber preparation to it the soft woof-threads flatten out and unite with each other, woof-thread to woof-thread, in spite of the interwoven warp-threads which are between them, to form what virtually amounts to a continuous almost felted mat. This mat, however, is so elastic that it is extremely resistant to punctures, for the force tending to puncture the fabric is not concentrated at one point, but is diffused through a comparatively large yielding area and absorbed on the principle of wadded or bullet-proof garments. Moreover, when layers of my improved fabric are superimposed upon each other in building up tubes the flattened or spread-out woof-threads are united by the rubber in the respective layers, which are thus bound together more intimately than they could be if hard-wound woof-threads were employed. It is to be pointed out also that in the process of calendering the fabric the soft woof-threads inclose and embed the harder warp-threads in such a way as to prevent the same from having their fibers crushed and broken by the pressure applied, for it is well known by persons familiar with this work that in calendering fabrics made of hard-wound yarns the fibers thereof are so frequently broken as to seriously affect the strength of the product, and this is the more objectionable because the extent of the injury is frequently not apparent. In my improved fabric, however, this source of weakness is entirely avoided, or so far avoided that it is not a factor to be considered. Moreover, the soft fluffy woof-threads employed by me are very much less expensive than the hard yarns ordinarily used for the woof-threads in close-woven fabrics, so that I secure a great economy of cost in the material as well as all of the very substantial functional advantages resulting from the employment of soft fluffy woof-threads. In my fabric the woof-threads continue to perform their functions as long as the tubes into which the fabrics are incorporated last, whereas in the so-called "thread" or "open-woven" fabric the woof-threads do not function after the fabrics are worked up, after which the warp-threads are entirely relied upon not only for body, but also for resistance to strains in all directions.

My improved fabric has in action (for to secure a right conception of the strains imposed upon the fabric entering into the composition of a pneumatic tire all of the threads must be thought of as in action to resist strains) all of the speed qualities and resiliency of tires produced from the so-called "open-woven" fabrics, in which only the warp-threads function in the product, and all of the stability of the closely-woven fabrics, with the addition of greatly superior puncture-resisting quality.

In the illustrations the fluffy woof-threads are markedly larger in diameter than the warp-threads. I prefer to have the threads differentiated markedly in this way, though this is not imperative. In fabrics for some kinds of tubes the differentiation might be less marked, or even the two classes of thread might practically correspond to each other in diameter, with a loss, however, of some of the advantages to be gained from the use of very fluffy woof-threads.

Having fully described my invention, what I claim as new, and desire to secure by Letters Patent, is—

1. As a new article of manufacture, a close-woven fabric or cloth for use in the production of air-tight tubing, comprising hard-wound warp-threads and loose-wound soft or fluffy woof-threads interwoven to form a sheet of true cloth having substantial strength both lengthwise and laterally, the strong warp-threads restraining internal pressure in the completed tubing and the soft woof-threads protecting the warp-threads against abrasion, and also forming a padding to resist puncture.

2. As a new article of manufacture, a close-woven fabric or cloth for use in the production of air-tight tubing, comprising an equal or substantially equal number of hard-wound warp-threads and loose-wound soft or fluffy woof-threads interwoven to form a sheet of true cloth having substantial strength both lengthwise and laterally, the strong warp-threads restraining internal pressure in the completed tubing, and the soft woof-threads 5 protecting the warp-threads against abrasion, and also forming a padding to resist puncture.

In testimony whereof I have signed this specification in the presence of two subscribing witnesses.

CHARLES E. W. WOODWARD.

Witnesses:
JOHN C. COLE,
A. L. BEERS.